United States Patent
Osaki

(10) Patent No.: US 7,849,330 B2
(45) Date of Patent: Dec. 7, 2010

(54) APPARATUS AND METHOD FOR SECURE DATA DISPOSAL

(75) Inventor: Nobuyuki Osaki, Saratoga, CA (US)

(73) Assignee: Hitachi, Ltd., Tokyo (JP)

( * ) Notice: Subject to any disclaimer, the term of this patent is extended or adjusted under 35 U.S.C. 154(b) by 1295 days.

(21) Appl. No.: 11/385,581

(22) Filed: Mar. 20, 2006

(65) Prior Publication Data

US 2007/0220277 A1 Sep. 20, 2007

(51) Int. Cl.
G06F 21/00 (2006.01)
(52) U.S. Cl. ........................................ 713/193; 713/165
(58) Field of Classification Search .................. 713/193
See application file for complete search history.

(56) References Cited

U.S. PATENT DOCUMENTS

| | | | |
|---|---|---|---|
| 6,112,187 A * | 8/2000 | Fukawa ........................ 705/18 |
| 6,304,948 B1 * | 10/2001 | Motoyama et al. ........... 711/162 |
| 7,082,536 B2 * | 7/2006 | Filipi-Martin et al. ....... 713/171 |
| 7,559,088 B2 * | 7/2009 | Cohen et al. .................. 726/26 |
| 2001/0032318 A1 * | 10/2001 | Yip et al. ..................... 713/190 |
| 2002/0057799 A1 * | 5/2002 | Kohno ......................... 380/228 |
| 2002/0069169 A1 * | 6/2002 | Sukeda et al. ................. 705/41 |
| 2002/0099959 A1 * | 7/2002 | Redlich et al. ............... 713/201 |
| 2002/0150245 A1 * | 10/2002 | Sugimoto et al. ........... 380/201 |
| 2003/0101350 A1 * | 5/2003 | Takada et al. ................ 713/189 |
| 2003/0115477 A1 * | 6/2003 | Baldwin et al. ............. 713/193 |
| 2003/0163719 A1 * | 8/2003 | Ebihara ....................... 713/193 |
| 2005/0084102 A1 * | 4/2005 | Hollar ......................... 380/201 |
| 2005/0234949 A1 * | 10/2005 | Asano ......................... 707/101 |
| 2006/0236274 A1 * | 10/2006 | Baumgartner et al. .......... 716/3 |

OTHER PUBLICATIONS

Gutmann, Peter, "Secure Deletion of Data from Magnetic and Solid-State Memory," *Sixth USENIX Security Symposium Proceedings*, Jul. 22-25, 1996, San Jose, California. http://www.cs.auckland.ac.nz/~pgut001/pubs/secure_del.html.
"NetApp-Decru Compliance Solutions, Advanced File Shredding and Security," 2004, Decru, Inc. http://www.decru.com/partnership/pdf/NetAppDecruFileShredding.pdf.
"Decru Datafort™ Storage Security Appliances," 2005, Decru, Inc. http://www.decru.com/products/datafort0.htm.

* cited by examiner

*Primary Examiner*—Gilberto Barron, Jr.
*Assistant Examiner*—David Le
(74) *Attorney, Agent, or Firm*—Sughrue Mion, PLLC

(57) ABSTRACT

When data is stored for a certain retention period, well prior to the expiration date, the storage controller starts encryption of data on a certain volume while ensuring data access from hosts, and repeats read and write of the data predefined number of times while also ensuring data access from hosts. When the expiration date is reached and if the encryption completes, the storage controller dispose of the encryption keys. Using this technique, one can reuse the volume for other purposes as soon as the expiration is reached. Because one can start this process even much earlier than the expiration date, one can balance the workload of the controller by scheduling the process in order to avoid the peak of the workload for the data disposal process. Also, it is possible to minimize the period to manage encryption keys which makes key management easier.

18 Claims, 13 Drawing Sheets

| # | LUN | Encryption Method | Rewrite Method | Rewrite Number | Current Key |
|---|------|---------------------------|----------------------------|----------------|-------------|
| 1 | 0001 | T-DES with 64 byte CBC    | Read and Write             | 3              | K1          |
| 2 | 0002 | T-DES with 512 byte CBC   | T-DES with 512 byte CBC    | 1              | K           |
| 3 | 0003 | AES128 with 64 byte CBC   | Read and Write             | 34             | K           |
| 4 | 0004 | AES128 with 64 byte CBC   | AES128 with 64 byte CBC    | 6              | K4          |
| 5 | 0005 | AES128 with 512 byte CBC  | Read and Write             | 6              | K5          |

Figure 2

| # | HDD Type | RAID Type | Volume Size | Encryption Method | Time |
|---|---|---|---|---|---|
| 1 | HDD1 100G 7200rpm | 0 | 100GB | T-DES with 64 byte CBC | 60 min |
| 2 | HDD1 100G 7200rpm | 0 | 100GB | T-DES with 512 byte CBC | 70 min |
| 3 | HDD1 100G 7200rpm | 0 | 100GB | AES128 with 64 byte CBC | 40 min |
| 4 | HDD1 100G 7200rpm | 0 | 100GB | AES128 with 512 byte CBC | 50 min |
| 5 | HDD1 100G 7200rpm | 0 | 100GB | Read and Write | 30 min |

Figure 3

| # | LUN | Expiration | Time to disposal after expiration |
|---|------|---------------------|---|
| 1 | 0001 | 3/20/2010 12:00:00 | 00:00:00 |
| 2 | 0002 | 3/20/2010 12:00:00 | 00:00:00 |
| 3 | 0003 | 3/22/2010 12:00:00 | 00:10:00 |
| 4 | 0004 | 3/22/2010 12:00:00 | 01:00:00 |
| 5 | 0005 | 3/24/2010 12:00:00 | 00:00:00 |

Figure 4

| # | LUN | Conversion start time | Key disposal time |
|---|------|----------------------|-------------------|
| 1 | 0001 | 3/20/2010 07:00:00 | 3/20/2010 12:00:00 |
| 2 | 0002 | 3/20/2010 05:00:00 | 3/20/2010 12:00:00 |
| 3 | 0003 | 3/21/2010 00:40:00 | 3/22/2010 12:10:00 |
| 4 | 0004 | 3/21/2010 22:00:00 | 3/22/2010 13:00:00 |
| 5 | | | |

Figure 10

|   | # | LUN | Capacity | HDD Type |
|---|---|---|---|---|
| 1102 |  |  |  |  |
| 1103 | 1 | 0001 | 200GB | HDD1 100G 7200rpm |
| 1104 | 2 | 0002 | 300GB | HDD1 100G 7200rpm |
| 1105 | 3 | 0003 | 200GB | HDD1 100G 7200rpm |
| 1106 | 4 | 0004 | 400GB | HDD1 100G 7200rpm |
|  | 5 | 0005 | 500GB | HDD1 100G 7200rpm |

Figure 11

APPARATUS AND METHOD FOR SECURE DATA DISPOSAL

FIELD OF THE INVENTION

The present invention generally related to computer security and more specifically to systems and methods for secure data disposal.

DESCRIPTION OF THE RELATED ART

In certain storage applications, data stored on magnetic disk drives must be retained for a certain time period and then, after the specified expiration date, securely disposed of. Once the expiration date has passed, the physical disks or other devices which contained the data may be re-used by other users or applications for other purposes or may be entirely disposed of. Because even after the erasure by conventional techniques, the magnetic storage media may leave traces of information, which used to be written thereon, there is a need for secure data erasure technique in order to avoid security breaches associated with sensitive information being accessed by unauthorized persons.

There exist conventional techniques for securely erasing data from magnetic media such as magnetic disks by means of overwriting such data multiple times with new or random data. For example, DoD (Department of Defense) Directive 5220, incorporated herein by reference calls for multiple data block overwrites to erase magnetic data. Another method for securely erasing data from magnetic media is described in "Secure Deletion of Data from Magnetic and Solid-State Memory" by Peter Gutmann, Department of Computer Science, University of Auckland, New Zeland (http://www.cs.auckland.ac.nz/~pgut001/pubs/secure_del.html), incorporated herein by reference. Unfortunately, all the conventional methods for sanitizing magnetic media are very time consuming and are not suitable for use when the disks need to be disposed of or reused immediately after the data expiration date or end of the usage of the data.

Another way to ensure secure disposal of data is to have the data securely encrypted with a key. It is known in the art that disposal of a key which encrypts such data has a similar effect to data disposal. For example, CRYPTOSHRED™ key deletion technology, available in products provided by Decru, Inc., involves secure deletion of encryption keys, resulting in all copies of associated encrypted data being instantly destroyed. As would be appreciated by those of skill in the art, this method, which involves disposing of encryption keys on a condition that the data has been encrypted and stored on magnetic disks, has a similar effect to secure data deletion described above. The primary advantage of the data deletion by cryptographic key disposal is in the speed of the data disposal process. Specifically, the key erasure takes a very short time compared with conventional techniques, wherein all data must be over-written multiple times. On the other hand, the cryptographic data disposal technique entails burdens associated with management and updating of encryption keys securely for extended periods of time.

Therefore, the conventional techniques fail to provide a methodology for fast and secure disposal of data written on various magnetic media upon the expiration thereof.

SUMMARY OF THE INVENTION

The inventive methodology is directed to methods and systems that substantially obviate one or more of the above and other problems associated with conventional techniques for secure data disposal.

One aspect of the invention is a computerized system, method and computer programming product for secure data disposal. The inventive system includes multiple storage volumes which store data having an expiration date and a storage controller operatively coupled with the logical storage volume, the storage controller comprising a central processing unit (CPU) and a memory unit, the memory unit storing information on the expiration date of the data stored in the storage volume and an encryption key. The aforesaid storage controller initiates the encryption of the data stored in one of the storage volumes using the stored encryption key to obtain encrypted data. The encryption is being initiated by the storage controller prior to the data expiration date. Additionally, the storage controller write the encrypted data to the one of the storage volumes, rewrite the encrypted data; and disposes of the encryption key.

Another aspect of the invention is a computerized system, method and computer programming product for securely disposing of data stored in multiple storage volumes. The data on each volume is associated with an expiration date. According to the inventive concept, an encryption method associated with a respective logical storage volume is being loaded and the stored data is encrypted with the loaded encryption method and an encryption key. The inventive technique also involves loading a data rewrite method associated with the respective storage volume and rewriting the encrypted data using the loaded rewrite method. Finally, the encryption key is disposed of in a secure manner.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 shows an exemplary embodiment of an algorithm table.

FIG. 3 shows an exemplary embodiment of a table that contains the estimated length of time required to process data rewriting for specific storage devices within the storage system.

FIG. 4 shows an exemplary embodiment of a table stored in the memory of the controller which contains the expiration date information for each data set designated by the corresponding logical unit number (LUN)

FIG. 10 shows an example of a scheduling table which specifies when the data conversion process described by FIG. 5 should start for each LU and when the key for each LU is discarded.

FIG. 11 shows a table generated by the processor when logical storage units are allocated.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

1. Exemplary System Configuration

Figure 1:
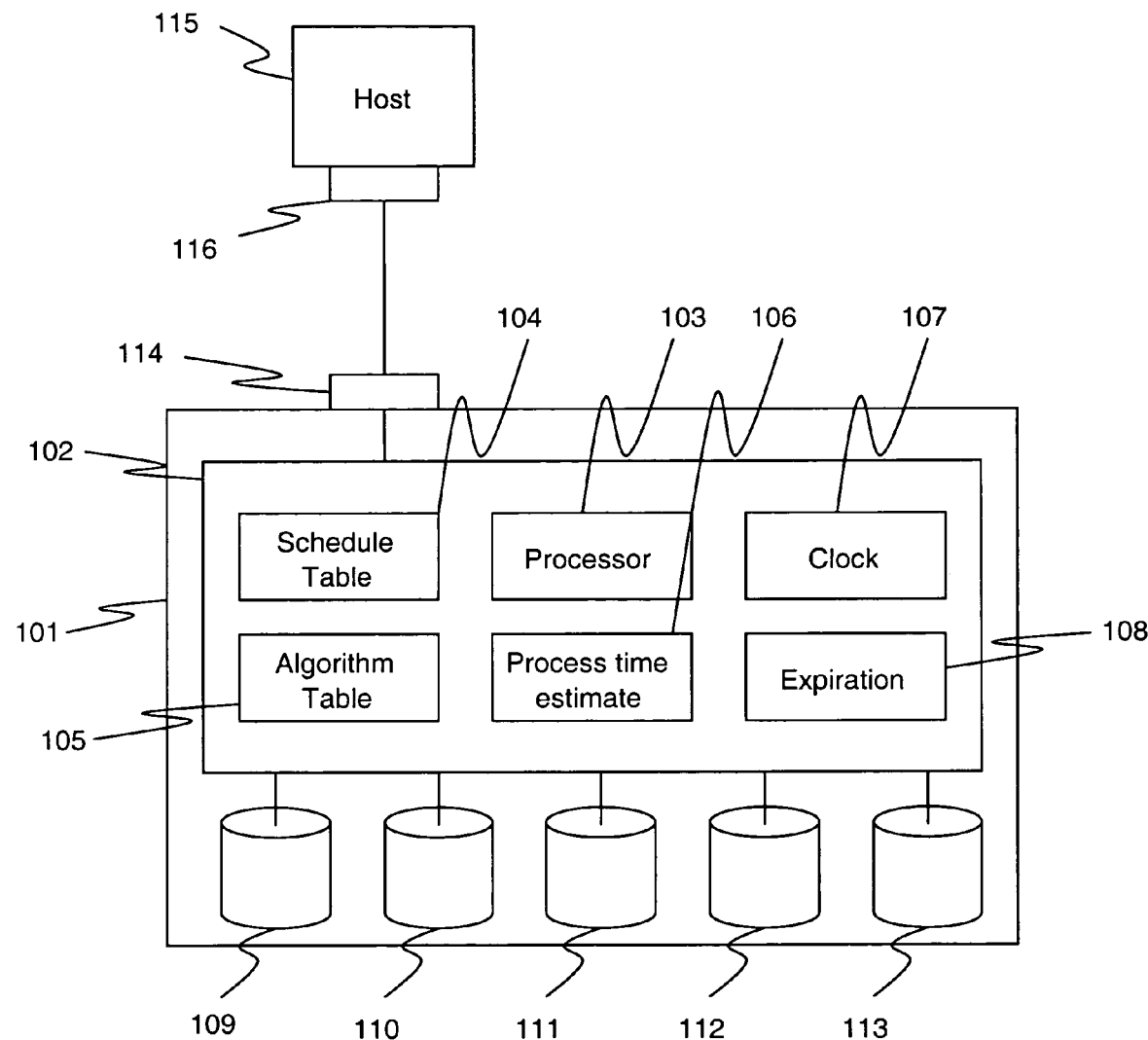
FIG. 1 shows an exemplary system configuration of an embodiment of the invention.

FIG. 1 shows an exemplary system configuration of an embodiment of the invention. The specific elements of the shown embodiment are described in detail below. Specifically, element 101 designates the storage system which has the functionality in accordance with the inventive technology. The storage system 101 includes a storage controller 102, which further includes a central processing unit (CPU) 103 and a schedule table 104, which stores information specifying when the data conversion process must starts for each logical storage unit (LU) and when the encryption key for each LU is discarded.

Numeral 105 designates an algorithm table, which is stored in the memory of the controller 102. The algorithm table 105 stores information on the algorithms that are user in encrypting the stored data. An exemplary embodiment of the table 105 is shown in FIG. 2 and designated with numeral 201. As shown in FIG. 2, the exemplary algorithm table stores information on encryption methods, rewrite methods, and the corresponding current encryption key. The information on the encryption method stored in table 105 (201) includes a designation of the encryption algorithm, the key length, if the algorithm can take several key lengths, and the mode of the rewrite operation.

The controller 102 further manages a table 106, which is stored in the memory in the controller 102. This table contains estimated length of time required to process data rewriting for specific storage devices within the storage system. An exemplary embodiment of this table 106 is shown in FIG. 3 and is designated in this figure with the numeral 301.

The storage controller 102 further includes a clock 107 and a table 108. The table 108 is stored in the memory of the controller 102 and contains expiration date information for each data set, designated by the corresponding logical unit number (LUN). An exemplary embodiment of table 108 is shown in FIG. 4 and designated with numeral 401 in that figure.

Finally, numerals 109 through 113 in FIG. 1 designate Logical Volumes, each of which is assigned a unique LUN (logical unit number). Specifically, the LUN of the volume 109 is 0001, the LUN of the volume 110 is 0002, and so on.

2. Exemplary System Operation

Figure 5:
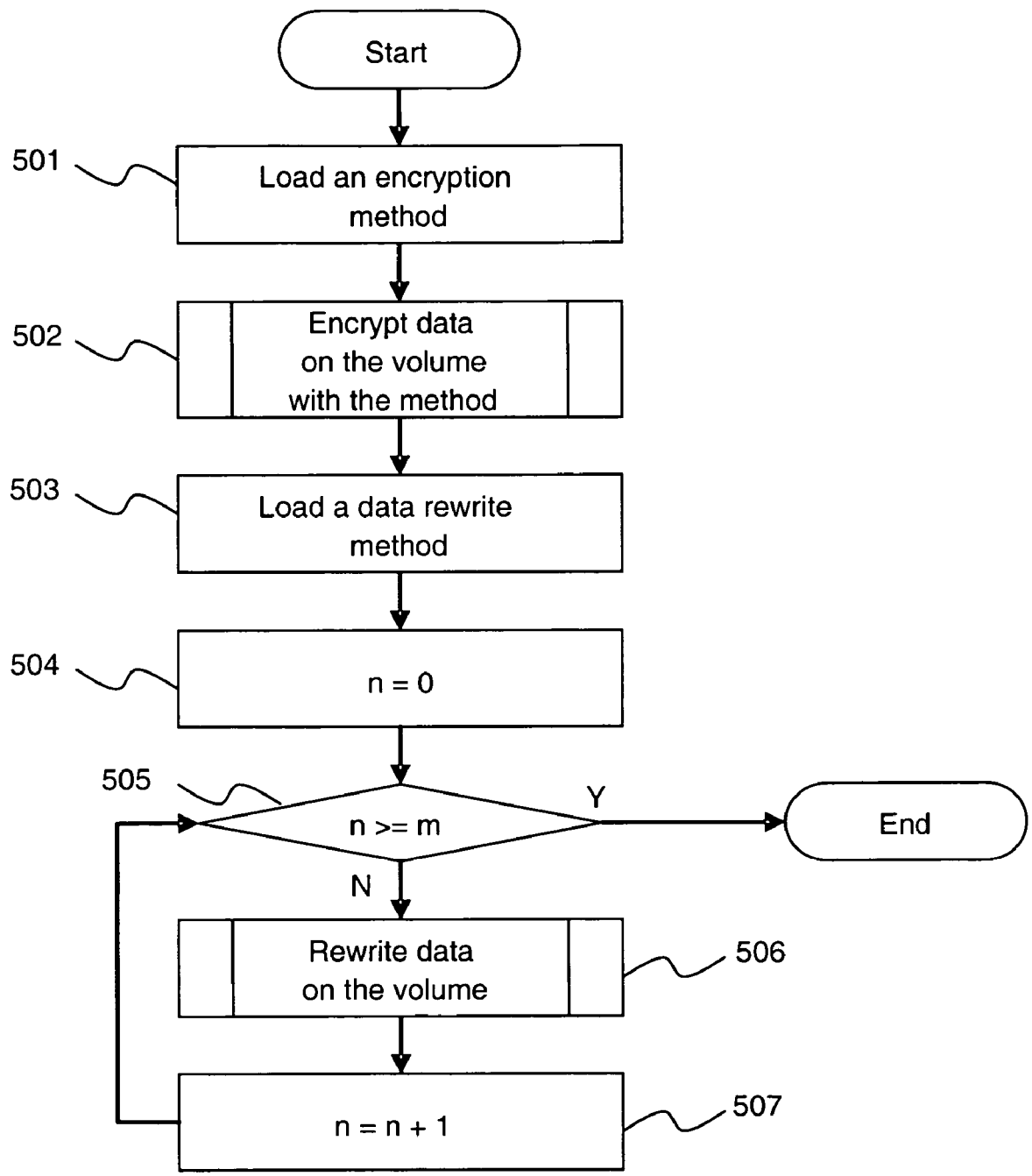
FIG. 5 illustrates the operation of the inventive algorithm for conversion of data volumes.

FIG. 5 illustrates the operation of the inventive algorithm for conversion of data volumes. The below description corresponds to the conversion of the data on volume 109, which has the LUN of 0001. As would be appreciated by those of skill in the art, the same algorithm may be applied to converting data stored in other logical volumes of the inventive storage system as well as data stored in various types of physical and logical storage units.

With reference to FIG. 5, at step 501, the processor 103 loads an encryption method into the memory in order to encrypt the data on the volume 109. The encryption algorithm is loaded from the aforesaid algorithm table 105 or 201. It should be noted that if the processor 103 supports only one algorithm, such as the algorithm described in the record 202 of the table 201 shown in FIG. 2, the algorithm information may not have to be stored in the form of a table as is shown as 105 or 201. In such a case, the encryption algorithm may be hard-coded either within the hardware of the processor 103 or within the corresponding software, which is executed by the processor 103.

After the encryption method is loaded, at step 502, the processor 103 proceeds to encrypt the data stored in the volume 109 with the loaded encryption method 202. The processor 103 may be configured to work in conjunction with an encryption chip or an encryption software module. During this conversion, the processor 103 may accept input-output (I/O) operations from the host 115, which may involve the data stored in the volume 109. In other words, the processor 103 may continue conversion of the data on the volume 109, while properly handling I/O requests from the host 115, which may involve the data being encrypted. The encryption key for this step is stored in the column 211 of the table 201.

At step 503, the processor 103 loads the data rewrite method, the description of which is also stored in the record 202 of table 201 of FIG. 2. The column 210 of the table 201, for example, stores values specifying how many times the data on a storage volume must be re-written. As would be appreciated by those of skill in the art, the multiple re-writing is necessary to erase physical traces of the data on the storage media, which, at least theoretically, may be used to restore the recently over-written data. For the example, according to the record 202 in the table 201, the data stored in the volume 109 with LUN 0001 will be read and re-written again 3 times.

The aforesaid data rewrite method could be, for example, one of the data encryption methods, such as the method used at step 502 of the inventive algorithm. Another suitable data rewrite method involves mere reading of the data from the corresponding storage volume and writing the read data at the same address, where the data was stored. On the physical level, such simple re-write operation accomplishes the purpose of eliminating physical traces of the previously written data.

In the case of the latter re-write algorithm, the processor 103 reads each block of data from the storage volume and writes it back to the same volume. During the aforesaid re-write operation, the physical address of the written data slightly varies with each write operation because the disk head, writing the data may use a slightly different orbit every time when the data is written. This achieves the aforesaid goal to replace the former plaintext data with encrypted data created at the step of 502 of the algorithm shown in FIG. 5, without leaving any physical traces of the old information on the storage media.

In an embodiment of the inventive system, during the re-write operation performed in accordance with any of the described algorithms, the processor 103 is configured to allow the host's I/O requests.

The contents of the table 201 will now be described with reference to FIG. 2. Table 201 stores information on the specific encryption method which is used for encrypt information on each logical storage unit (LU). Specifically, the column 208 identifies the encryption method, while the column 209 identifies the data rewrite method for each LU listed in column 207. The decision at steps 501 and 505 of the inventive algorithm shown in FIG. 5 are made based on the contents of the table 201. If there is only one data encryption/re-writing algorithm available for each of the steps 501 or 505, the methods which are normally chosen at those steps can be hard coded and may not appear explicitly.

At step 504, the processor 103 initializes a re-write counter 'n' to zero. At step 505, the processor 103 compares the number of the already performed re-writes n with the predetermined number of rewrites m, obtained from the table 201. The number of re-writes m is a predefined number, which indicates how many times the data rewrite process is repeated. If it is determined that n is larger than or equal to m, then the conversion process has been completed. On the other hand, if n is smaller than m, the processor 103 performs data rewrite process at step 506 and increments the counter n by one at step 507. Subsequently, the process proceeds back to the aforesaid step 505, whereupon another counter check is performed.

When one of the encryption methods is used for performing the data rewrites, a different encryption key may be used for each data re-writing step 506. If a different key is used for each data rewriting step 506, during each subsequent rewrite, the data in the LU is first decrypted using the previous version of the key and then again re-encrypted using the new key. As it would be appreciated by those of skill in the art, upon the completion of the last re-write, only the encryption key for the final rewrite needs to be stored in the column 211 of the table 201 until the expiration date and other encryption keys used at the step 502 or the previous step(s) 506 may be discarded. However, during each encrypting or re-writing process, the old key (not required for the encryption step 502), the new key and the address where the rewriting process has been completed using the new key have to be stored somewhere in the persistent memory so that the encrypted data can be recovered in the case of the controller 102 failure etc. In an embodiment of the invention, the encryption keys used for one logical storage unit (LU) are different from those for other LUs.

After the data has been completely or partially encrypted, and until the data expiration date, the processor 103 may still receive the data access operation requests from the host 115, which may involve the encrypted data. Upon the receipt of a data write request from the host, the processor 103 encrypts the received data with the encryption key stored in table 201 and writes the data so encrypted to the storage volume. Upon the receipt of the data read request, the processor, likewise, decrypts the requested data read from the storage volume using the encryption key store in table 201 and furnishes the decrypted data to the requesting host 115. In the algorithm table 201, the encryption key that is being currently used is stored in the column 211. When the conversion process completes, the encryption key for the final round or re-write operations is stored in column 211 of the table 201.

When read and write method are used as the data rewrite method 506, the processor 103 always encrypts data in the write requests and write it on the volume when it receives write requests, and decrypt data on the volume when it receives read requests with the encryption key used at step 502, which is stored in 211. During the read and write process, the processor 103 does not have to decrypt/encrypt data as long as the data is no read or written by host.

Figure 6:
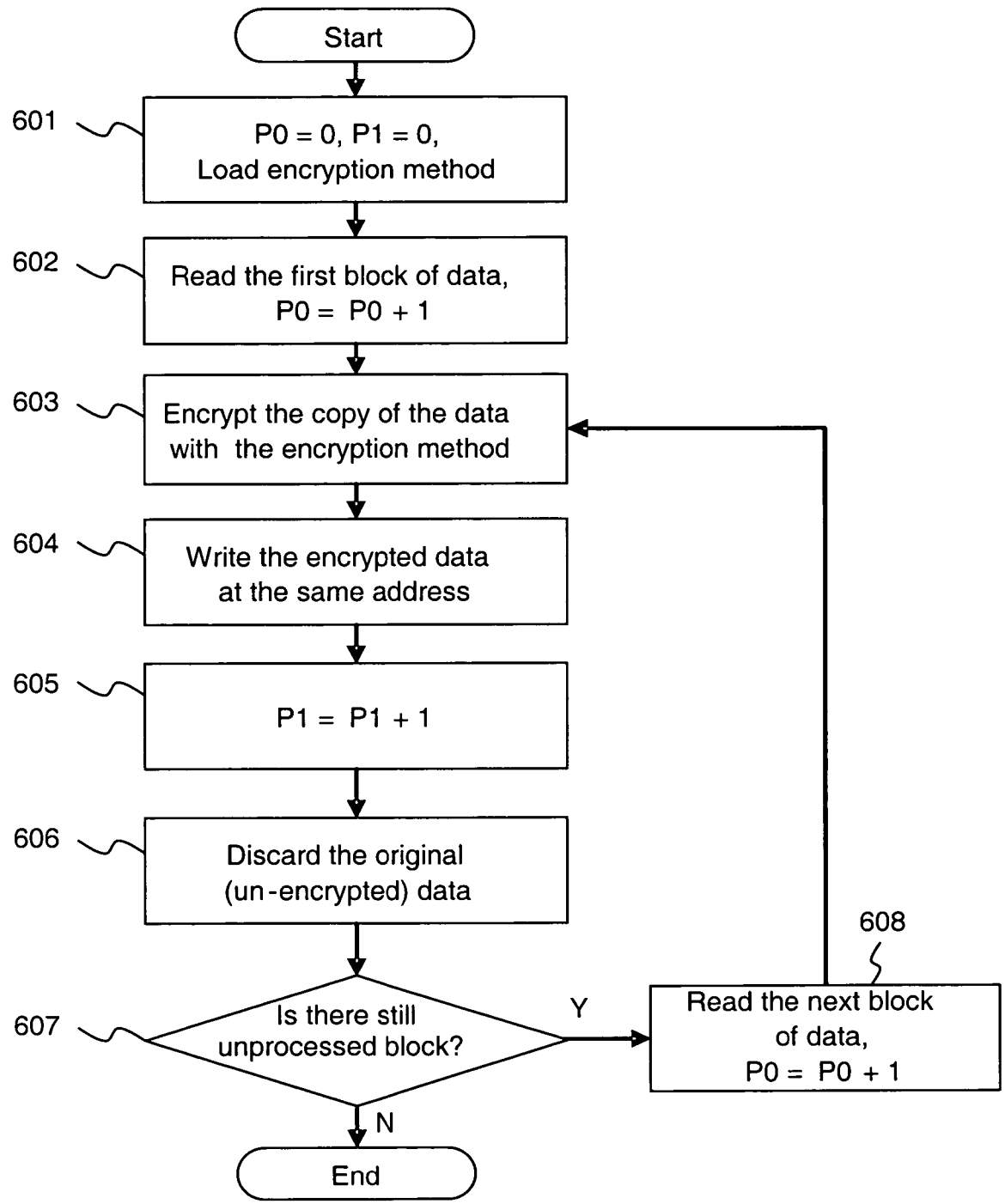
FIG. 6 illustrates an exemplary algorithm for data processing.

FIG. 6 provides additional details on the execution of the aforesaid step 502. Specifically, at step 601, the processor 103 initializes variables P0 and P1 to have zero value, and loads the encryption method chosen at step 501. At step 602, the processor 103 reads the first block of data from the volume 109, then increments variable P0 by one. The P0 variable identifies the storage block within the logical storage unit that is being processed.

At step 603, the processor 103 creates a copy of the data from the target logical storage unit and encrypts it with the prescribed encryption method. In the exemplary algorithm illustrated in FIG. 6, the encryption method is a triple DES encryption algorithm with the mode of operation CBC, applied to each 64 byte long data segment in the block.

At step 604, the processor 103 writes the encrypted data at the same address within the logical storage unit, from which the original data was read. At step 605, the processor 103 increments the variable P1 by one. The variable P1 represents the number of blocks which have been processed by the processor 103.

At step 606, the processor 103 discards the copy of the data which has not been encrypted. This data copy is preserved during the encryption process so that the processor 103 can allow host 115 to read the affected data while the data is being processed.

Finally, at step 607, the processor 103 checks for an unprocessed block within the volume 109. If such a block is found, the processor 103 reads the next block of the data and increments the counter P0 by one at step 608. If all the data has been processed, this process ends.

Figure 7:
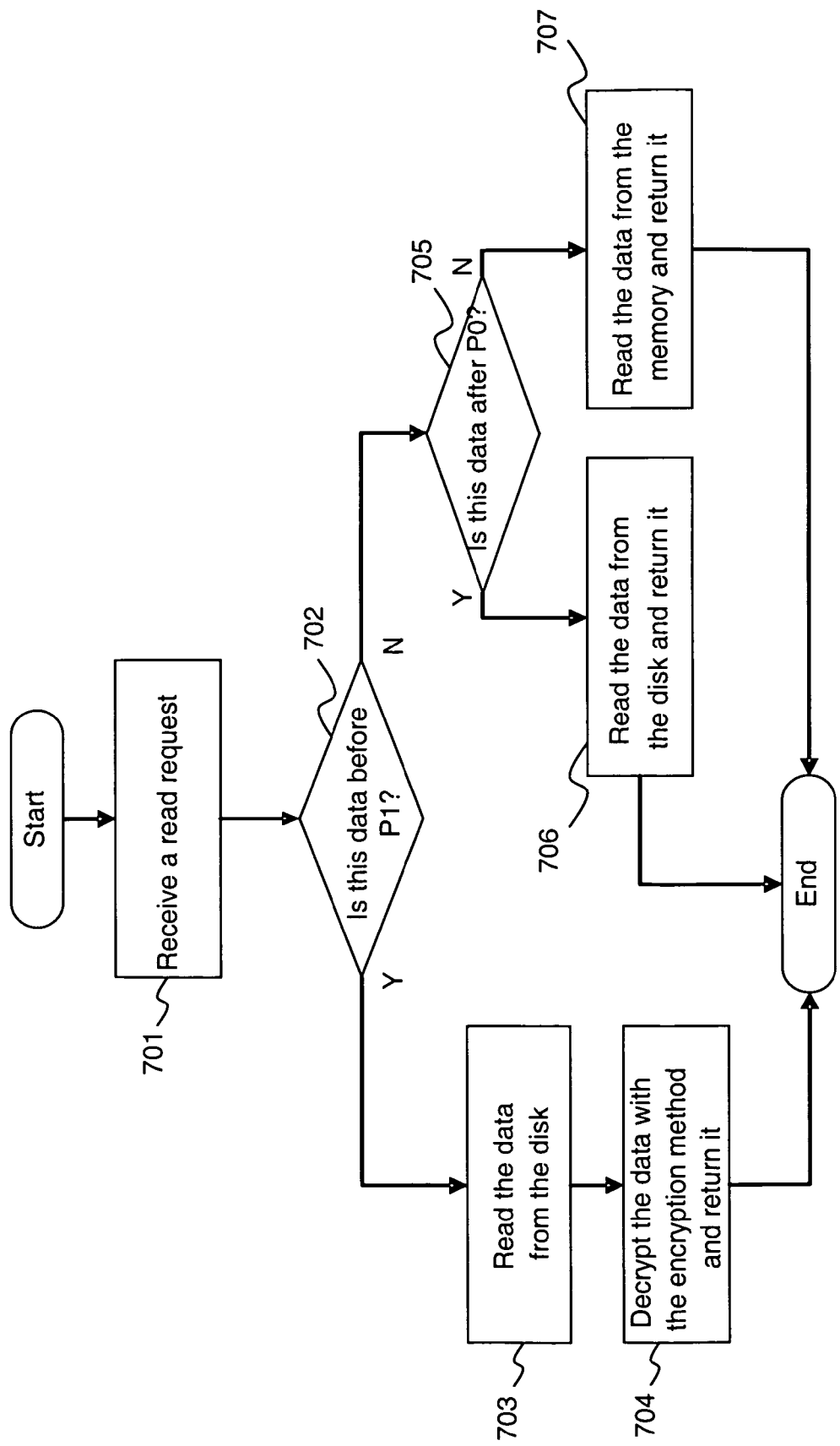
FIG. 7 illustrates the method used by the processor to handle read requests while the processor performs the data encryption process described in FIG. 6.

FIG. 7 illustrates the method used by the processor 103 to handle read requests while the processor performs the data encryption process described in FIG. 6. With reference to FIG. 7, when the processor 103 receives a read request from the host 115, it checks whether the requested data has already been processed (encrypted). This is accomplished by comparing the address of the requested data with the value of the variable P1. If the address of the requested data is before the P1, this means the data has already been encrypted. In this case, the data is read back from the disk at step 703. The read data is then decrypted with the appropriate encryption method and then returned to the requesting host at step 704.

If the address of the requested data is after both the P1 and P0, it indicates that the data has not yet been encrypted. In this case, the processor 103 simply reads the data from the disk and returns the data to the requesting host 115. This is accomplished at step 706. If the requested data is located at P0-th block, the corresponding plaintext data is held by the processor 103. Therefore, the processor 103 returns the unencrypted data to the host 115 at step 707.

Figure 8:
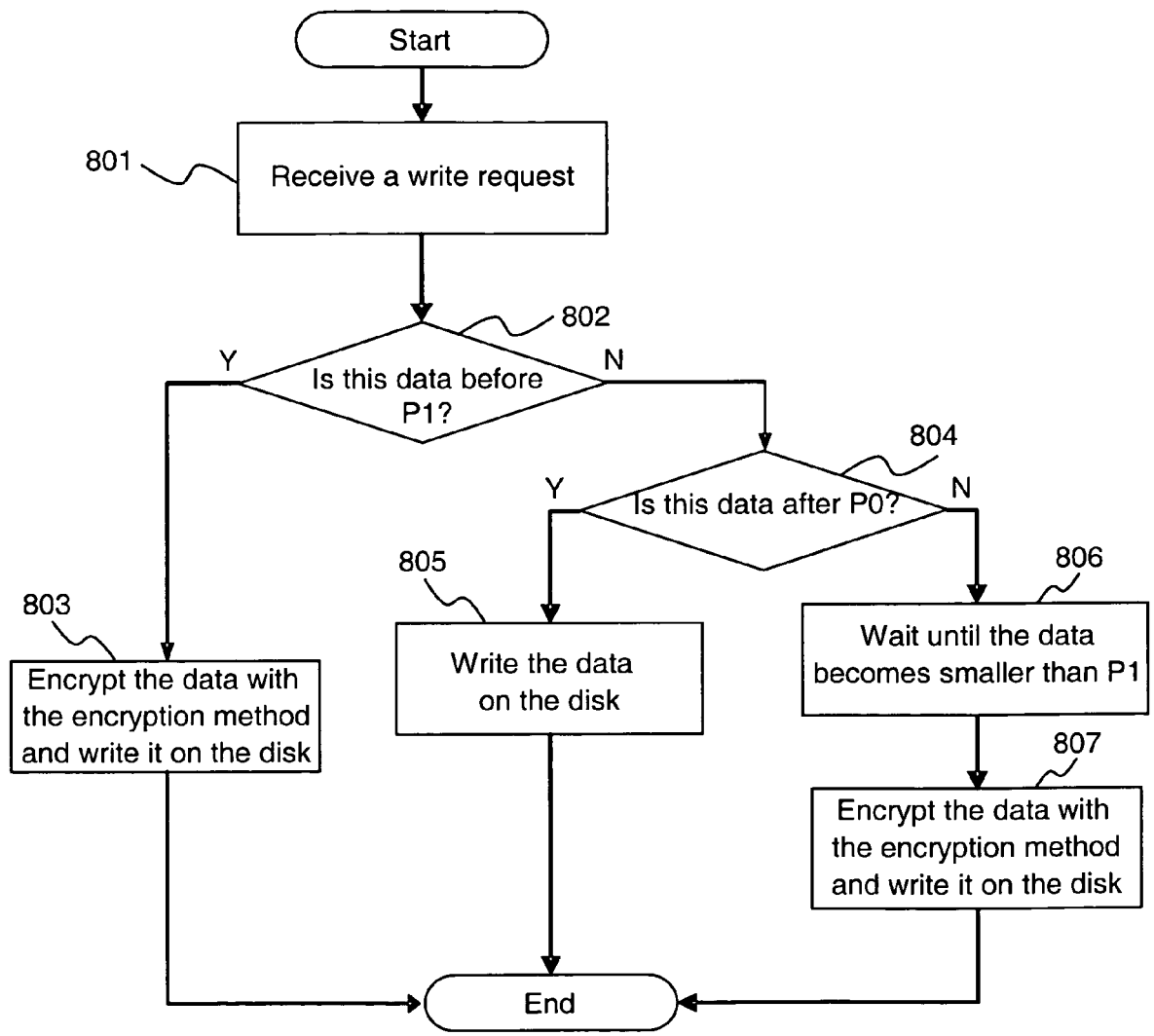
FIG. 8 illustrates an exemplary embodiment of a method used by the processor 103 to handle write requests while the process described in FIG. 6 is performed.

FIG. 8 illustrates an exemplary embodiment of a method used by the processor 103 to handle write requests while the process described in FIG. 6 is performed. Specifically, when the processor 103 receives a write request from the host 115, it checks whether the data is to be written before or after the P1 address. If the data is to be written before the P1 address, the processor 103 encrypts the data received from the host with the encryption method and writes the encrypted data tp the address specified in the write command.

On the other hand, if the data is to be written after the P1 address and after the P0 address, the processor 103 simply writes the data to the disk without encryption. If the data is to be written at the P0-th block, which is being processed in accordance with the process of FIG. 6, the processor 103 waits until the process shown in FIG. 6 completes processing of the block (step 806), and then encrypts the data received from the host with the appropriate encryption method and writes the encrypted data to the disk at step 807. As would be appreciated by those of skill in the art, the foregoing description provides just one exemplary embodiment of the algorithm for accessing the data while the data processing operation is under way.

Other suitable processes may be utilized for this purpose as well. Specifically, if the data encryption process of FIG. 6 is just before the step 603, and if the data read from the disk at the step 602/608 can be replaced with the data provided by the host together with the write command, the data from the write request may be encrypted according with the process of FIG. 6, and the steps 806 and 807 do not take place.

As it has been described in detail above, the rewrite process described with reference to the step 506 can be an encryption process, such as the process shown in FIG. 6, or it can involve simple read and write operations. The column 208 in the table 201 of FIG. 2 lists exemplary rewrite methods. Specifically, the table 201 indicates that the "Read and Write" method is used as the data rewrite method for the storage device with LUN 0001, see column 202.

Figure 9:
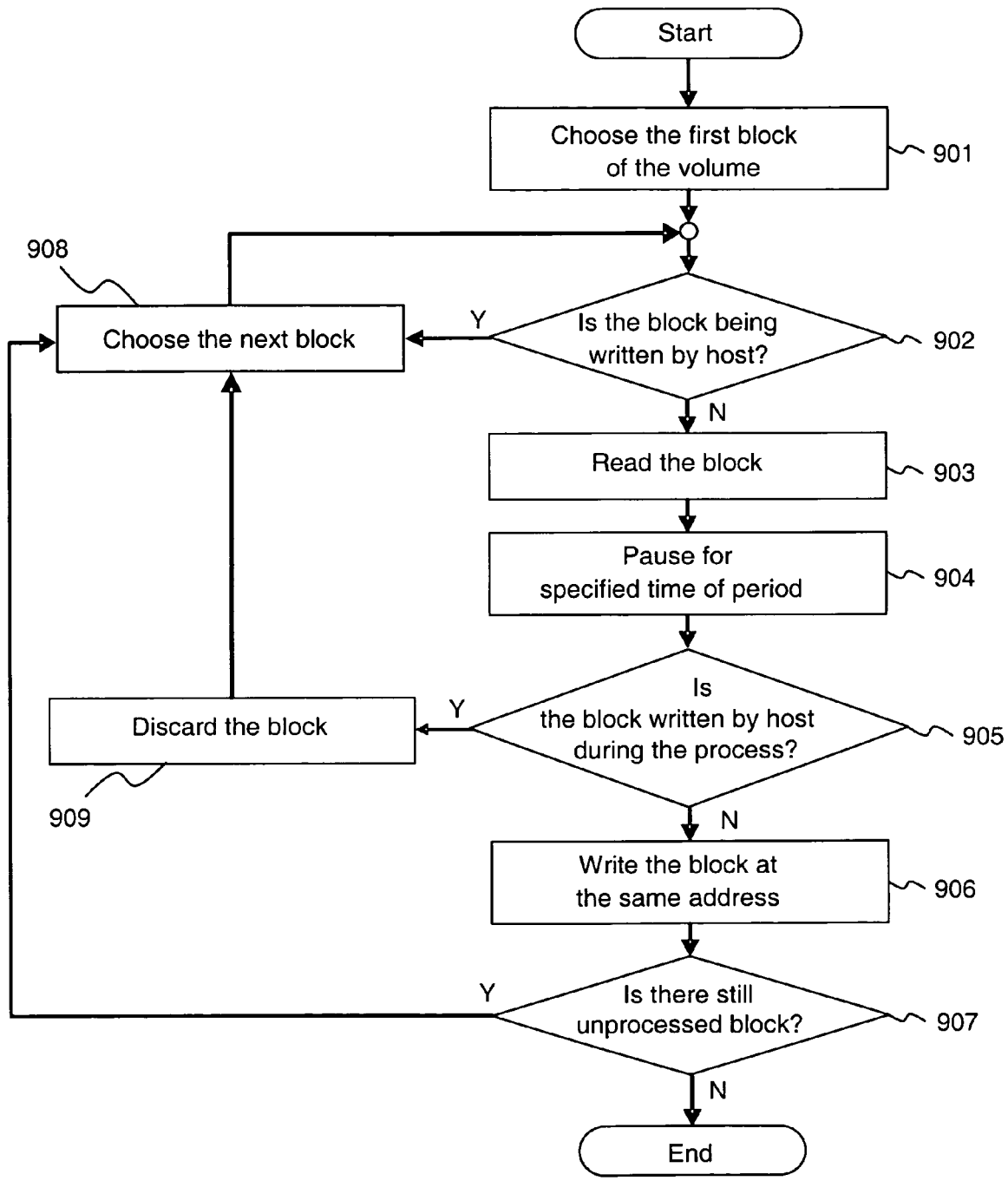
FIG. 9 illustrates the steps of the "Read and Write" process in mode detail.

FIG. 9 illustrates the steps of the "Read and Write" process in more detail. Initially, at step 901, the processor 103 chooses the first block of the data volume. At step 902, the processor 103 determines whether the chosen block is being written by host 115. If the block is being so written, the processor 103 chooses the next block at step 908. If it is not, the processor 103 reads the block at step 903.

At step 904, the processor 103 may pause for a specified time of period, such as, for example, 10 seconds or 1 minute. This pause is not a mandatory step. Depending on the characteristics of the magnetic disk, it may be appropriate to wait for some time for the purpose of more completely filling the magnetic surface of the storage media with the data. At step 905, the processor 103 determines whether the data block has been written by host 115 since the completion of the step 903. If so, the data is discarded at step 909 and the process proceeds to the step 908.

If the block has not been so written, the processor 103 writes the data block back at the same address, from which the data was read at step 903.

At step 907, the processor 103 determines whether there is still an unprocessed block on the storage volume. If all of the data blocks have been processed, the process terminates. If unprocessed blocks are found, the process proceeds to step 908.

As it has been described herein, a rewrite process for a data block can be skipped when other process has already rewritten the block, because the rewriting of those skipped blocks may be handled in the previous or subsequent rewriting processes sufficient number of times to conceal the trace of the plain data. However, if the rewriting processes need to be performed the exact number of times specified in the column 210, the skip shall not happen. In such a case, the algorithms described in FIGS. 6, 7 and 8 are used in order to accept input and output requests from the host during the rewriting process. However, in this case, the data encryption or decryption is not performed in the respective process steps such as steps 603, 704, 803 and 807 of the inventive process flows shown in FIGS. 6, 7 and 8. It is assumed that encryption and decryption according to host input and output requests are performed in parallel with this process.

Table 1001 shown in FIG. 10 is an example of scheduling table 104 which specifies when the data conversion process described by FIG. 5 should start for each LU and when the key for each LU is discarded. The processor 103 generates this information using the information contained within the tables 201, 301, 401, and 1101.

Table 1101 shown in FIG. 11 is generated by the processor 103 when the LUs are allocated. Depending on the characteristics of the data stored in each LU, the entry of the algorithm table 201 which describes the algorithms used to convert data and the expiration date/time in the column 407 in the table 401 are read by the processor 103 for each LU. In certain situations, the actual data disposal time may be later than the corresponding data expiration date. In such a case, the cell 409 of the table 401, which specifies the time to disposal after the data expiration, has a non-zero value. The column 311 of the table 301 shown in FIG. 3 describes how long each algorithm listed in column 310 takes to process a specific data volume having the storage capacity listed in column 309. The data in the table 301 is provided for a specific storage configuration, which is specified in columns 307 and 308 of that table. Using the aforesaid tables, information in the table 1001 is populated by the processor 103.

The conversion start time in column 1008 of table 1001 is the time when the processor 103 must start the conversion in order to complete the conversion process just in time for the data expiration date. For example, because it takes 300 minutes for the volume LUN 0001 to be converted, the conversion start time is "3/20/2010 07:00:00", which is 300 minutes prior to the expiration time. The encryption key disposal time in column 1009 of table 1001 is the time when the key used for converting each LU can be disposed of. This time indicates when the data is erased.

The processor 103 periodically checks the table 1001 and the clock 107 to determine if there are any processes that need to be stated. If such processes exist, the processor 103 starts the conversion process illustrated in FIG. 5, or disposes of the key for the corresponding LU.

3. Exemplary Applications of the Inventive Technique

A. Use Case 1

After the conversion process has been completed, and after the expiration date of the volume data, the processor 103 may discard the encryption key stored in the column 211 of table 201. As would be appreciated by those of skill in the art, the loss of the key has the same effect as a secure erasure of the stored data. Table 401 contains the information indicating when the key is scheduled to be discarded for each logical storage unit.

B. Use Case 2.

Using the information in the tables of 201, 301 and 1101, it is possible to calculate how long it takes to perform the data conversion process described in FIG. 5. Specifically, the information in the aforesaid tables shown that 100 minutes, 420 minutes, 2120 minutes and 840 minutes are required to complete the conversion process for the storage volumes with LUN values of 0001, 0002, 0003 and 0004, respectively.

Figure 12:
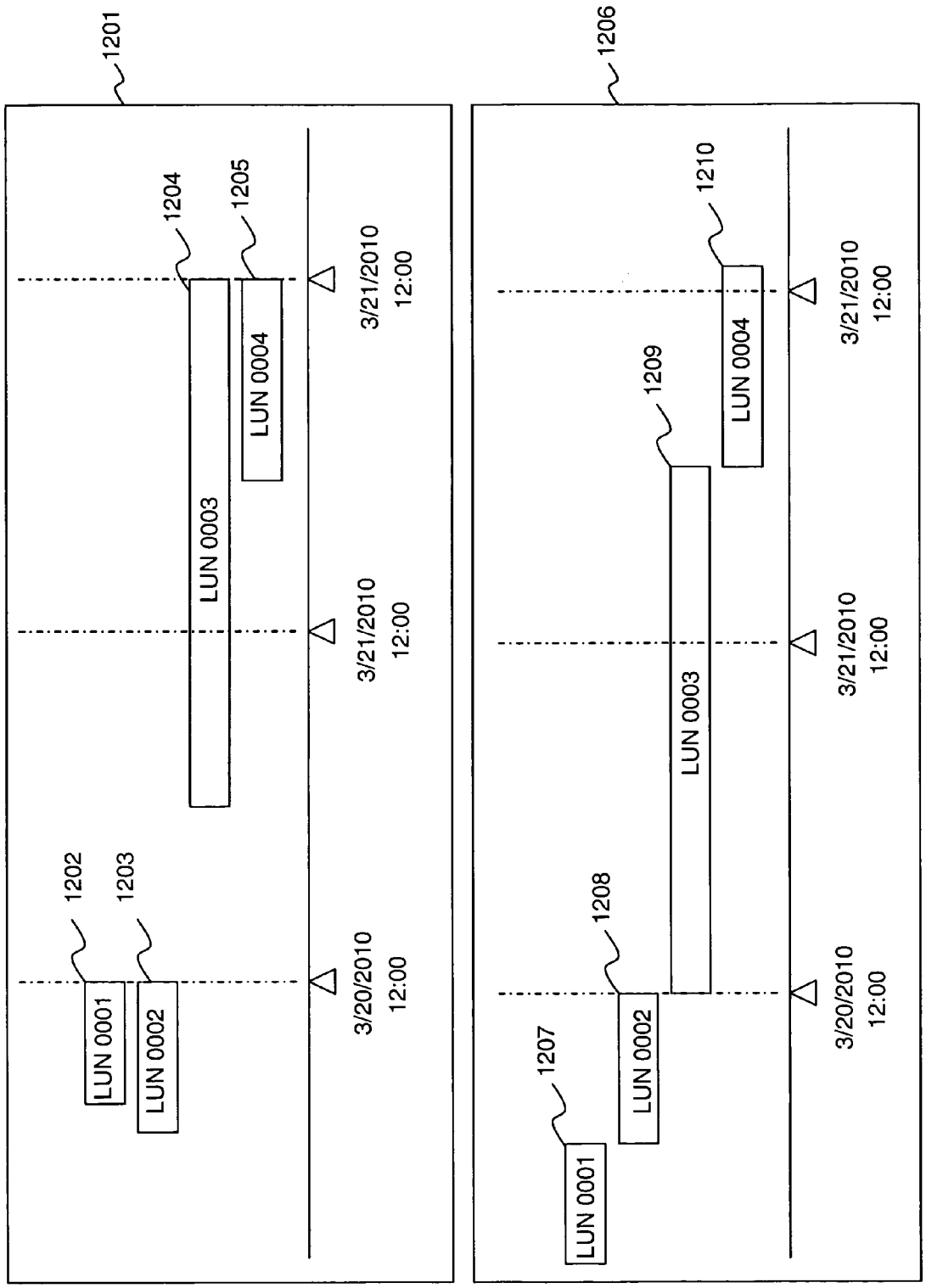
FIG. 12 shows a time chart which indicates when the inventive conversion processes for each LU must start executing, so that each process completes on the respective data expiration time as specified in the table of FIG. 4.

Numeral 1201 in FIG. 12 designates a time chart indicating when the inventive conversion processes for each LU must start executing, so that each process completes on the respective data expiration time as specified in the table 401 of FIG. 4. For example, if the processor 103 starts the conversion process 300 minutes prior to the expiration time of the data on LUN 0001, the conversion process completes just in time, see the element 1202 of the aforesaid figure.

However, because the execution of each conversion process may impose a heavy workload upon the available storage system resources, it is preferable to schedule the conversion processes in such a way as to avoid an impact of one such process on other processes within the storage system or on other conversion processes.

Specifically, element 1206 of FIG. 12 designates an exemplary conversion process execution schedule, which seeks to minimize the impact of multiple data conversion processes on one another. For example, the conversion process 1207, corresponding to the data stored in the volume with LUN 0001, starts 420 minutes earlier than process 1202, with the processor 103 scheduled to process only one volume at a time until 3/20/2010 12:00.

Also, the conversion process 1209 for the storage device with LUN 0003 starts just after the process for LUN 0002 ends and the conversion process 1210 for the LUN 0004 starts just after the process 1209 for LUN 0003 ends. In the shown example, the process 1210 for LUN 0004 still continues for a certain period of time after the expiration time reaches. However, the processor 103 is scheduled to process only one volume at a time, which may be more preferable for some applications, than completing the process always before the expiration date/time.

The described schedule may be changed when new LU is added to the storage system. When the schedule is changed, the schedule table 401 is updated by the processor 103.

Figure 13:
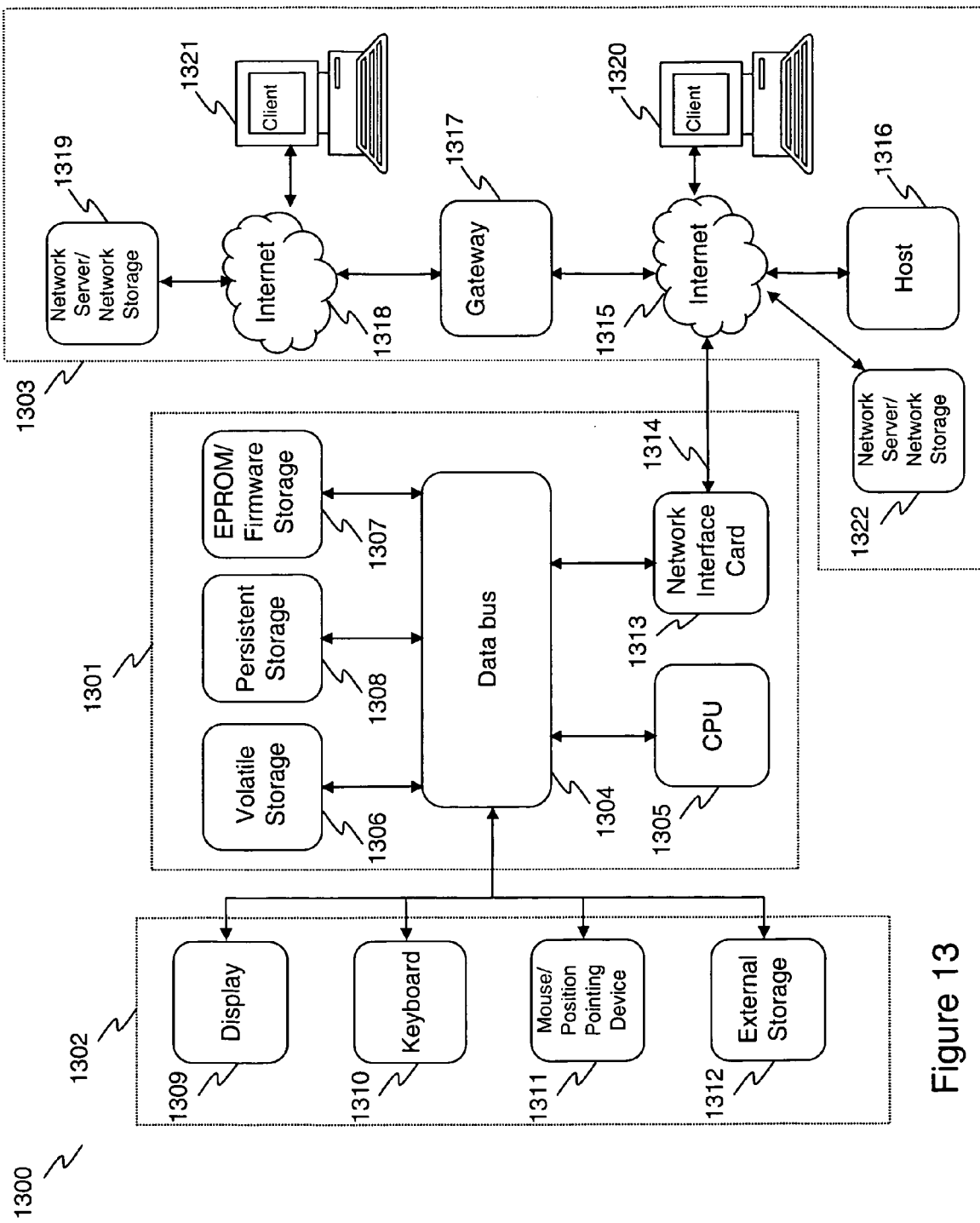
FIG. 13 illustrates an exemplary embodiment of a computer platform upon which the inventive system may be implemented.

FIG. 13 is a block diagram that illustrates an embodiment of a computer/server system 1300 upon which an embodiment of the inventive methodology may be implemented. The system 1300 includes a computer/server platform 1301, peripheral devices 1302 and network resources 1303.

The computer platform 1301 may include a data bus 1304 or other communication mechanism for communicating information across and among various parts of the computer platform 1301, and a processor 1305 coupled with bus 1301 for processing information and performing other computational and control tasks. Computer platform 1301 also includes a volatile storage 1306, such as a random access memory (RAM) or other dynamic storage device, coupled to bus 1304 for storing various information as well as instructions to be executed by processor 1305. The volatile storage 1306 also may be used for storing temporary variables or other intermediate information during execution of instructions by processor 1305. Computer platform 1301 may further include a read only memory (ROM or EPROM) 1307 or other static storage device coupled to bus 1304 for storing static information and instructions for processor 1305, such as basic input-output system (BIOS), as well as various system configuration parameters. A persistent storage device 1308, such as a magnetic disk, optical disk, or solid-state flash memory device is provided and coupled to bus 1301 for storing information and instructions.

Computer platform 1301 may be coupled via bus 1304 to a display 1309, such as a cathode ray tube (CRT), plasma display, or a liquid crystal display (LCD), for displaying information to a system administrator or user of the computer platform 1301. An input device 1310, including alphanumeric and other keys, is coupled to bus 1301 for communicating information and command selections to processor 1305. Another type of user input device is cursor control device 1311, such as a mouse, a trackball, or cursor direction keys for communicating direction information and command selections to processor 1304 and for controlling cursor movement on display 1309. This input device typically has two degrees of freedom in two axes, a first axis (e.g., x) and a second axis (e.g., y), that allows the device to specify positions in a plane.

An external storage device 1312 may be connected to the computer platform 1301 via bus 1304 to provide an extra or removable storage capacity for the computer platform 1301. In an embodiment of the computer system 1300, the external removable storage device 1312 may be used to facilitate exchange of data with other computer systems.

The invention is related to the use of computer system 1300 for implementing the techniques described herein. In an embodiment, the inventive system may reside on a machine such as computer platform 1301. According to one embodiment of the invention, the techniques described herein are performed by computer system 1300 in response to processor 1305 executing one or more sequences of one or more instructions contained in the volatile memory 1306. Such instructions may be read into volatile memory 1306 from another computer-readable medium, such as persistent storage device 1308. Execution of the sequences of instructions contained in the volatile memory 1306 causes processor 1305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1305 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1308. Volatile media includes dynamic memory, such as volatile storage 1306. Transmission media includes coaxial cables, copper wire and fiber optics, including the wires that comprise data bus 1304. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1305 for execution. For example, the instructions may initially be carried on a magnetic disk from a remote computer. Alternatively, a remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on the data bus 1304. The bus 1304 carries the data to the volatile storage 1306, from which processor 1305 retrieves and executes the instructions. The instructions received by the volatile memory 1306 may optionally be stored on persistent storage device 1308 either before or after execution by processor 1305. The instructions may also be downloaded into the computer platform 1301 via Internet using a variety of network data communication protocols well known in the art.

The computer platform 1301 also includes a communication interface, such as network interface card 1313 coupled to the data bus 1304. Communication interface 1313 provides a two-way data communication coupling to a network link 1314 that is connected to a local network 1315. For example, communication interface 1313 may be an integrated services digital network (ISDN) card or a modem to provide a data communication connection to a corresponding type of telephone line. As another example, communication interface 1313 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1313 sends and receives electrical, electromagnetic or optical signals that carry digital data streams representing various types of information.

Network link 1313 typically provides data communication through one or more networks to other network resources. For example, network link 1314 may provide a connection through local network 1315 to a host computer 1316, or a network storage/server 1317. Additionally or alternatively, the network link 1313 may connect through gateway/firewall 1317 to the wide-area or global network 1318, such as an Internet. Thus, the computer platform 1301 can access network resources located anywhere on the Internet 1318, such as a remote network storage/server 1319. On the other hand, the computer platform 1301 may also be accessed by clients located anywhere on the local area network 1315 and/or the Internet 1318. The network clients 1320 and 1321 may themselves be implemented based on the computer platform similar to the platform 1301.

Local network 1315 and the Internet 1318 both use electrical, electromagnetic or optical signals that carry digital data streams. The signals through the various networks and the signals on network link 1314 and through communication interface 1313, which carry the digital data to and from computer platform 1301, are exemplary forms of carrier waves transporting the information.

Computer platform 1301 can send messages and receive data, including program code, through the variety of network(s) including Internet 1318 and LAN 1315, network link 1314 and communication interface 1313. In the Internet example, when the system 1301 acts as a network server, it might transmit a requested code or data for an application program running on client(s) 1320 and/or 1321 through Internet 1318, gateway/firewall 1317, local area network 1315 and communication interface 1313. Similarly, it may receive code from other network resources.

The received code may be executed by processor 1305 as it is received, and/or stored in persistent or volatile storage devices 1308 and 1306, respectively, or other non-volatile storage for later execution. In this manner, computer system 1301 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A computerized system comprising:
   a. a plurality of storage volumes operable to store data, the stored data being associated with an expiration date;
   b. a storage controller operatively coupled with the storage volumes, the storage controller comprising a central processing unit (CPU) and a memory unit, the memory unit storing information on the expiration date of the data stored in the storage volumes and an encryption key, wherein the storage controller is operable to:
      i. initiate the encryption of the data stored in one of the plurality storage volume using the stored encryption key to obtain encrypted data, the encryption is being initiated by the storage controller prior to the data expiration date; and
      ii. write the encrypted data to an address where the data was stored in said one of the plurality of storage volumes; and
      iii. dispose of the encryption key after the expiration date,
         wherein in response to a read command, said encrypted data is decrypted by using said encryption key,
         wherein said encryption is performed repetitively and the encrypted data is written over the same address,
         wherein the storage controller is operable to allow access to the storage volumes from a host during the encryption operation;
         wherein the memory unit is operable to store, for each of the plurality of logical storage volumes, an associated encryption algorithm which is used by the storage controller in encrypting the data stored in that logical storage volume.

2. The computerized system of claim 1, wherein said encryption is performed periodically, and wherein the memory unit is operable to store at least one of an encryption start time and an encryption key disposal time.

3. The computerized system of claim 1, wherein the memory unit is operable to store, for each of the plurality of logical storage volumes, at least one of an associated encryption start time and an associated encryption key disposal time.

4. The computerized system of claim 1, wherein the CPU is operable to calculate an encryption start time for each of the logical storage volumes based on a respective data expiration date, the encryption algorithm associated with that volume and a size of the data stored in that logical storage volume.

5. The computerized system of claim 4, wherein the memory unit is operable to store, for each of the logical storage volumes, the calculated encryption start time.

6. The computerized system of claim 1, wherein a plurality of encryption methods are used for said repetitive encryption;
   wherein said storage controller conducts encryption process in unit of blocks, and keeps record of up to which block the encryption has proceeded,
   wherein said storage controller determines whether the encryption has been conducted in response to said read command and a write command, and
   wherein in response to said write command if said storage controller determines that the encryption has been conducted to a location of the storage volume to be stored, the storage controller encrypts the data before storing the data to the storage volume.

7. A computerized system comprising:
   a. a plurality of storage volumes operable to store data, the stored data being associated with an expiration date;
   b. a storage controller operatively coupled with the storage volumes, the storage controller comprising a central processing unit (CPU) and a memory unit, the memory unit storing information on the expiration date of the data stored in the storage volumes and an encryption key, wherein the storage controller is operable to:
      i. initiate the encryption of the data stored in one of the plurality storage volume using the stored encryption key to obtain encrypted data, the encryption is being initiated by the storage controller prior to the data expiration date; and
      ii. write the encrypted data to an address where the data was stored in said one of the plurality of storage volumes; and
      iii. dispose of the encryption key after the expiration date,
         wherein in response to a read command, said encrypted data is decrypted by using said encryption key,
         wherein said encryption is performed repetitively and the encrypted data is written over the same address,
      wherein the storage controller is operable to allow access to the storage volumes from a host during the encryption operation;
      wherein the memory unit is operable to store, for each of the plurality of logical storage volumes, an associated data rewrite algorithm, which is used by the storage controller in rewriting the data stored in that logical storage volume.

8. The computerized system of claim 1, wherein the storage controller is operable to rewrite the encrypted data a predetermined number of rewrite times.

9. The computerized system of claim 1, wherein the memory unit is operable to store, for each of the plurality of logical storage volumes, an associated rewrite number indicating how many times the data stored in that logical storage volume should be rewritten.

10. A method for securely disposing of data stored in a plurality of logical storage volumes, each of the logical storage volumes being associated with an expiration date, the method comprising:
    a. loading an encryption method associated with a respective logical storage volume;
    b. encrypting the stored data by processing each block in said respective logical storage volume with the loaded encryption method and an encryption key;
    c. loading a data rewrite method associated with the respective logical storage volume;
    d. repetitively rewriting the encrypted data using the loaded rewrite method; and
    e. securely disposing of the encryption key,
    wherein in response to a read command, a controller determines whether the stored data has been encrypted or not and decrypts the rewritten encrypted data if the stored data has been encrypted by using the encryption key,
    wherein the controller is operable to allow access to the logical storage volumes from a host during the encrypting.

11. The method of claim 10, wherein each of the plurality of storage volumes is associated with a rewrite number, indicating how many times the data stored in that logical storage volume should be rewritten and wherein the rewrite number determines the repetitions of the repetitive rewriting of step d.

12. The method of claim 10, wherein b. comprises:
    i. reading a block of data from one of the plurality of logical storage volumes;
    ii. making a copy of the read data block;
    iii. encrypting the copy of the read block with the loaded encryption method;
    iv. writing the encrypted data block at its original address within the logical storage volume;
    v. discarding the unencrypted data block; and
    vi. repeating a. through e. for all data blocks in the logical storage volume.

13. The method of claim 12, further comprising, upon a request received from a host during the encryption, providing the unencrypted copy of the read data block to the requesting host.

14. The method of claim 10, further comprising:
    i. receiving a request from a host for data stored in a logical storage volume;
    ii. determining whether the requested data has been encrypted;
    iii. if requested data has been encrypted, reading the requested data from the logical storage unit, decrypting the read data and returning the decrypted data to the requesting host;
    iv. if the requested data has not been encrypted, determining whether the requested data is associated with a data block that is being processed;
    v. if the requested data is associated with a data block that is being processed, reading the requested data from memory and returning the requested data to the requesting host; and
    vi. if the requested data is not associated with a data block that is being processed, reading the requested data from the logical storage volume and returning the requested data to the requesting host.

15. The method of claim 10, further comprising:
    i. receiving a request from a host to write data to a logical storage volume;
    ii. determining whether the data should be written to an encrypted portion of the logical storage volume;

iii. if the data should be written to the encrypted portion of the logical storage volume, encrypting the data and writing it to the encrypted portion of the logical storage volume;
iv. if the data should not be written to the encrypted portion of the logical storage volume, determining whether the data is associated with a data block that is being processed;
v. if the data is associated with a data block that is being processed, waiting for the processing to complete, encrypting the data and writing the encrypted data to the logical storage volume; and
vi. if the data is not associated with a data block that is being processed, writing the data to the logical storage volume.

16. The method of claim 10,
wherein said encryption of stored data in said respective logical storage volume is performed periodically and rewriting of the encrypted data is performed on the same address it was stored,
wherein the rewrite method comprises encrypting the data.

17. The method of claim 10,
wherein said storage controller determines whether the encryption has been conducted in response to said read command and a write command,
wherein in response to said write command, said controller checks if the encryption has been conducted to a location of respective storage volume for data to be stored, and if the encryption has been conducted to a location of respective storage volume for data to be stored, the controller encrypts the data before storing to the data to the respective storage volume.

18. The method of claim 10, wherein a plurality of encryption methods are utilized.

* * * * *